April 20, 1965 A. E. HARROLD 3,179,751

TELEPHONE INSTRUMENTS

Filed Oct. 26, 1961

INVENTOR
ARTHUR EDWARD HARROLD

BY
Kurschiten, Kurschiten & Ottinger

ATTORNEYS

United States Patent Office 3,179,751

Patented Apr. 20, 1965

3,179,751
TELEPHONE INSTRUMENTS

Arthur Edward Harrold, Coventry, England, assignor to The General Electric Company Limited, London, England Filed Oct. 26, 1961, Ser. No. 147,777
Claims priority, application Great Britain, Oct. 27, 1960, 36,943/60
9 Claims. (Cl. 179—100)

This invention relates to telephone instruments.

The invention is particularly concerned with casings for telephone instruments.

Throughout this specification the term "telephone instrument" means the combination of a telephone handset, a telephone dial, a casing which carries the telephone dial and which has a cradle for supporting the handset, when not in use, and a cradle switch which is carried by the casing and which is arranged to be operated when the handset is in the cradle.

It is well known that when a telephone instrument is connected in a telephone system the handset has to be removed from the cradle to release the cradle switch before the instrument can be used for initiating or answering a telephone call.

Sometimes the casing of a telephone instrument has to be held steady while the dial is operated. Thus a person may wish to use the instrument where no firm support is available for the instrument casing, for example while sitting in bed. Again, even if a firm support is available the weight of the instrument casing and the apparatus which it carries may not be sufficient to hold that casing steady against the forces that are applied to operate the telephone dial.

With known telephone instruments it is difficult usually both to support the handset and to steady the casing, when this is necessary, using one hand so as to leave the other hand free to operate the telephone dial.

It is an object of the present invention to provide an improved construction of casing for a telephone instrument that enables this difficulty to be overcome.

According to the present invention, a casing for a telephone instrument has a handle portion which extends from the front of that casing over the open side of the cradle, the arrangement being such that a handset can be lifted from the cradle to a predetermined position in which it is in contact with the handle portion and in which that handset can be gripped against the handle portion to steady the casing using one hand only.

According to a feature of the present invention, in a telephone instrument the casing of that instrument has a handle portion which extends from the front of that casing over the open side of the cradle, the arrangement being such that the handset can be lifted from the cradle to a predetermined position in which it is in contact with the handle portion and in which the handset can be gripped against the handle portion with one hand, at the same time steadying the casing, while the dial is operated with the other hand.

One example of a telephone instrument in accordance with the present invention will now be described with reference to the two figures of the accompanying drawings in which.

Figure 1:
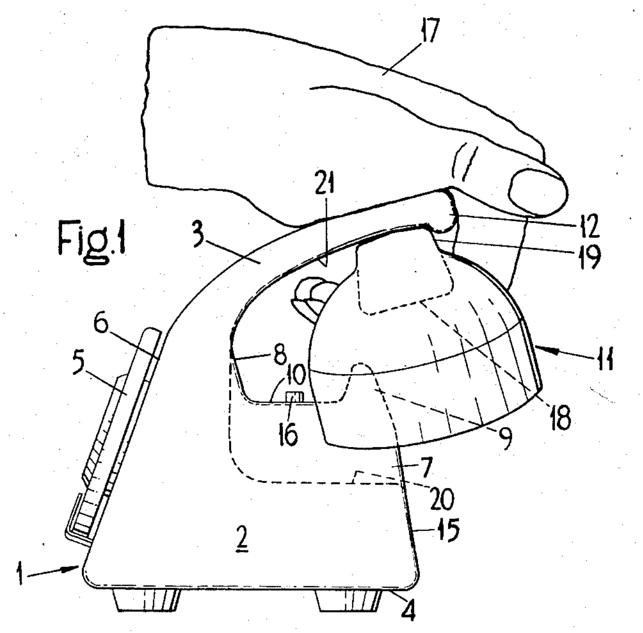
FIGURE 1 shows a side elevation of the telephone instrument.

Referring to the drawings, the telephone instrument has a casing 1 that comprises a hollow body portion 2 and a handle portion 3 which are of unitary construction. The body portion 2 has a flat base 4 and a telephone dial 5 is mounted in its front wall 6 which is inclined at an angle of about 60° to the base 4 over a substantial part of its length. Each side wall of the body portion 2, for example the side wall 7 has a pair of raised parts 8 and 9 at the top end thereof of which one part 8 joins with the front wall 6 of the casing 1 and extends to a greater height above the base 4 than the other part 9. The two depressions 10 and the like formed between these pairs of raised parts 8, 9 and the like respectively form a cradle wherein a handset 11 of the telephone instrument is supported when not in use.

The handle portion 3 comprises a continuation of the front wall 6 of the body portion 2. This front wall 6 is curved where it meets the handle portion 3 which thus is arranged to extend across the cradle 10 and the like at an angle of about 20° to the base 4. The end part of the handle portion 3 is turned down so that it forms a small lip 12. The length of the handle portion 3 is such that with the base 4 horizontal, this lip 12 is to the rear of the raised parts 9 and 13 of the side walls 7 and 14 that are adjacent to the rear wall 15 of the body portion 2. The separation between the handle portion 3 and these particular raised parts 9 and 13 is such that the handset 11 can pass freely between them.

Figure 2:
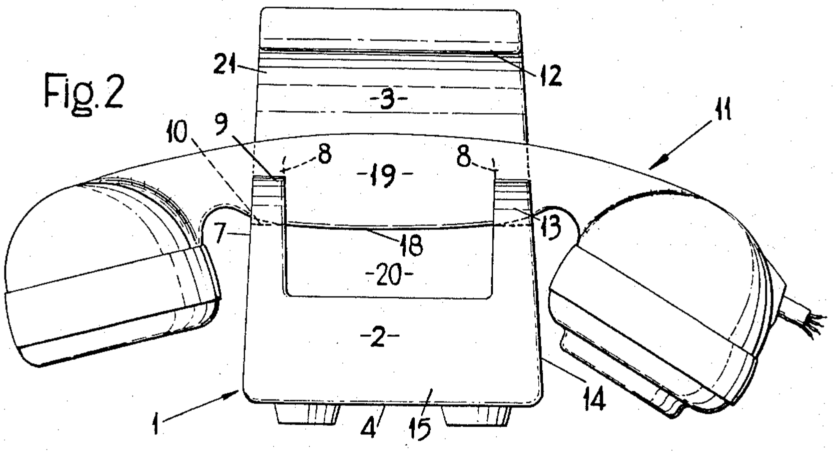
FIGURE 2 shows a rear elevation of that instrument.

A cradle switch (not shown) is carried within the body portion 2 of the casing 1. This cradle switch has two spring restored plungers 16 and the like which extend generally at right angles to the base 4 through apertures in the casing 1 so that portions thereof project into the cradle 10 and the like. It is arranged that when the handset 11 is in position in the cradle 10 and the like, as shown in FIGURE 2, it bears upon these plungers 16 and the like which are thereby depressed to operate the cradle switch and when the handset 11 is removed from the cradle 10 and the like these plungers 16 and the like restore to their raised positions, as in FIGURE 1, and the cradle switch is released. The cradle switch is arranged in well known manner so that the impulsing contacts (not shown) of the telephone dial 5 and the transmitter and receiver (not shown) of the handset 11 are all connected in circuit with line terminals (not shown) of the telephone instrument only when the cradle switch is released.

To use the telephone instrument it is first necessary to lift the handset 11 from the cradle 10 and the like so that the cradle switch releases. This may be achieved by placing the palm of one hand 17 (FIGURE 1) against the handle portion 3 and bending the fingers to engage the underside 18 of the hand part 19 of the handset 11. In this connection, the rear wall 15 of the casing 1 has a recess 20 to provide easy access for the fingers to this part 19 of the handset 11 which lies between the two depressions 10 and the like which form the cradle. As the fingers are closed towards the palm of the hand 17 the handset 11 is lifted into engagement with the underside 21 of the handle portion 3 whereafter it is displaced rearwardly by virtue of the inclination of this handle portion 3 to the base 4 of the casing 1. The rearward displacement of the handset 11 is arrested when that handset is brought into engagement with the lip 12 of the handle portion 3 whereupon the handset and the handle portion can be gripped firmly against one another and the casing thus steadied while the dial 5 is operated by the other hand (not shown).

To remove the handset 11 subsequently from the casing 1, the grip is relaxed so that the handset drops below the lip 12, and the hand 17 is moved rearwardly until the handset is clear of that lip. If the handset 11 is inadvertently dropped during its removal then, because of the positioning of the lip 12 relative to the raised parts 9 and 13 of the side walls 7 and 14 that are adjacent to the rear wall 15 of the body portion 2, the handset 11 will not usually fall back into the cradle 10 and the like and so effect the release of a telephone call which has been set up but will normally drop to the rear of those raised parts 9 and 13.

If it is not required to steady the casing 1 when the handset 11 is removed from the cradle 10 and the like this can readily be done without engaging the lip 12 by lifting the handset clear of the raised parts 9 and 13 of the side walls 7 and 14 and simultaneously moving it in a rearward direction until it is beyond that lip. The handset 11 is replaced in the cradle 10 and the like by reversing this procedure.

It is not essential for the handle portion 3 and the body portion 2 of the casing 1 to be of unitary construction. Thus in another example of telephone instrument (not shown) in accordance with the present invention a handle portion corresponding to the handle portion 3 is fabricated from a sheet of metal and is attached to the body portion by means of screws. Yet another example of telephone instrument (not shown) in accordance with the present invention differs from the telephone instrument described above in that the handle portion 3 is replaced by an assembly (not shown) comprising two horns which are parallel to one another in plan view and are similar in side elevation to the handle portion 3, and a plate which extends between these horns adjacent to their free ends and which provides a support for the palm of a hand used to lift the handset of the instrument from its cradle.

I claim:

1. A casing for a telephone instrument comprising a front wall, two side walls having upstanding portions which form a cradle support for a telephone handset, a rear wall shaped to provide a finger receiving rearwardly and upwardly opening recess immediately under the cradle support and a handle portion immovably fixed to the base and which extends rearwardly from the front wall across the cradle support and which is at a distance above the cradle support such as not to impede the passage of a handset into that support from the rear of the casing, the said recess enabling fingers of a hand to be entered under a handset in the cradle support so that this handset can be clasped by that hand from the cradle support and against the handle portion.

2. A casing according to claim 1 wherein the end part of the said handle portion is turned down to form a small lip to retain a handset clasped against this handle portion.

3. A casing according to claim 2 wherein the said handle portion is of a length such that said lip is rearward of said rear wall.

4. A casing according to claim 3 wherein said front and rear walls are inclined inwardly towards the cradle support.

5. A telephone instrument comprising a telephone handset, a casing and a telephone dial, the casing comprising a front wall on which the dial is mounted, two side walls having upstanding portions which form a cradle support for the handset, a rear wall shaped to provide a finger receiving rearwardly and upwardly opening recess immediately under the cradle support, and a handle portion immovably fixed to the base and which extends rearwardly from the front wall across the cradle support and which is at a distance above the cradle support such as not to impede the passage of the handset into that support from the rear of the casing, the said recess enabling fingers of a hand to be entered under the handset in the cradle support so that the handset can be clasped by that hand from the cradle support and against the handle portion.

6. A telephone instrument comprising a telephone handset, a casing and a telephone dial, the casing comprising a front wall on which the dial is mounted, two side walls having upstanding portions which form a cradle support for the handset, a rear wall shaped to provide a finger receiving rearwardly and upwardly opening recess immediately under the cradle support and a handle portion which comprises an integral continuation of the front wall that extends across the cradle support and which is inclined away from the cradle support so as to afford clearance for the passage of the handset into that support from the rear of the casing, said recess providing an entry for fingers of a hand under the handset in the cradle support to enable clasping of the handset by that hand from the cradle support and into engagement with the handle portion.

7. A telephone instrument comprising a telephone handset, a casing, a telephone dial and a pair of plungers spring loaded to an upper position, the casing comprising a front wall on which the dial is mounted, two side walls having upstanding portions which form a cradle support and between which the plungers are positioned for operation by the handset when placed in the cradle support, a rear wall shaped to provide a finger receiving rearwardly and upwardly opening recess immediately under the cradle support and a handle portion immovably fixed to the base and which extends rearwardly from the front wall across the cradle support and which is at a distance above the cradle support such as not to impede the passage of the handset into that support from the rear of the casing, the said recess providing an entry for fingers of a hand under the handset in the cradle support to enable clasping of the handset by that hand from the cradle support and against the handle portion at a height at which the handset clears the plungers in their upper position.

8. A casing for a telephone instrument comprising a front wall, two side walls having upstanding portions which form a pair of cradle supports spaced from one another from side to side of the casing, said supports being adapted to have seated thereon a telephone handset, a rear wall shaped to provide a finger receiving recess immediately under and between the cradle supports, said recess opening rearwardly below the cradle supports and upwardly between the cradle supports and a handle portion immovably fixed to the base and which extends rearwardly from the front wall across the cradle supports and which is at a distance above the cradle supports such as not to impede the passage of a handset into these supports from the rear of the casing, the said recess enabling fingers of a hand to be entered under a handset on the cradle supports so that this handset can be clasped by that hand from between the cradle supports and against the handle portion.

9. A telephone instrument comprising a telephone handset, a casing, a telephone dial, and a pair of plungers spring loaded to an upper position, the casing comprising a front wall, two side walls having upstanding portions which form cradle supports for a telephone handset, a rear wall shaped to provide a finger receiving rearwardly and upwardly opening recess immediately under the cradle supports and a handle portion immovably fixed to the base and which extends rearwardly from the front wall across the cradle supports and which are at a distance above the cradle supports such as not to impede the passage of a handset into these supports from the rear of the casing, the said recess enabling fingers of a hand to be entered under a handset on the cradle supports so that this handset can be clasped by that hand from between the cradle supports and against the handle portion at a height at which the handset clears the plungers in their upper position.

References Cited by the Examiner

UNITED STATES PATENTS 2,200,810 5/60 Sengebusch ............ 179—146

ROBERT H. ROSE, *Primary Examiner.*

WILLIAM C. COOPER, *Examiner.*